United States Patent [19]

Kalnin et al.

[11] Patent Number: 4,632,775
[45] Date of Patent: Dec. 30, 1986

[54] PROCESS FOR THE INTERCALATION OF GRAPHITIC CARBON EMPLOYING SULFUR TRIOXIDE

[75] Inventors: Ilmar L. Kalnin, Millington; Harris A. Goldberg, Colonia; George J. Breckenridge, Jr., Clark, all of N.J.

[73] Assignee: Celanese Corporation, New York, N.Y.

[21] Appl. No.: 737,769

[22] Filed: May 28, 1985

[51] Int. Cl.$^4$ .............................................. H01B 1/04
[52] U.S. Cl. .................................... 252/502; 252/506; 252/507; 423/449; 423/454; 423/458; 556/465; 556/478
[58] Field of Search ........................ 252/502, 506, 507; 423/445, 447.1; 556/43, 52, 71, 465, 478; 568/13; 423/447.2, 449, 454, 458, 461; 428/374, 902

[56] References Cited

U.S. PATENT DOCUMENTS

| | | | |
|---|---|---|---|
| 3,925,495 | 12/1975 | Rodewald | 585/744 |
| 3,984,352 | 10/1976 | Rodewald | 585/747 |
| 4,388,227 | 6/1983 | Kalnin | 252/506 |

Primary Examiner—Josephine L. Barr
Attorney, Agent, or Firm—Burns, Doane, Swecker & Mathis

[57] ABSTRACT

An improved procedure is provided for increasing the electrical conductivity of graphite via intercalation. It has been found that sulfur trioxide has the ability to substantially aid the intercalation of graphite by previously known intercalants such as (a) fluorosulfonic acid, chlorosulfonic acid, or mixtures thereof, (b) a boron trihalide, a tetrahalide of a Group IV element, a pentahalide of a Group V element, or mixtures thereof, and (c) mixtures of (a) and (b). Such presence of sulfur trioxide during the graphite intercalation reaction has been found to expedite the rate at which intercalation takes place and possibly enables the achievement of a greater electrical conductivity than would have otherwise been obtained. In a preferred embodiment the graphitic carbon is present within a carbonaceous fibrous material at the time of its intercalation and the resulting product is substantially electrically oriented along the axis of the fiber.

19 Claims, No Drawings

PROCESS FOR THE INTERCALATION OF GRAPHITIC CARBON EMPLOYING SULFUR TRIOXIDE

BACKGROUND OF THE INVENTION

It has long been known that the unique crystalline structure of graphite makes it anisotropic with respect to conducting electrons. Its structure basically comprises planes of aromatically bound carbon atoms. Hence, each of such planes has $\pi$ clouds of electrons above and below it. These electron clouds have been said to contribute to its anisotropic conductive behavior, the conductivity being in a direction parallel to the aromatic carbon planes. This conductivity is approximately 5 percent that of copper.

It also has been known that certain elements or molecules, when diffused into the graphite lattice, assume positions interstitial to the aromatic planes and improve graphite conductivity. Ubbeholde, for example, found that the interstitial compound formed between graphite and nitric acid has a conductivity almost equal to that of copper (which is $0.6 \times 10^6$ ohms$^{-1}$ cm.$^{-1}$) when measured parallel to the aromatic planes [A. R. Ubbeholde, Proc. Roy. Soc., A304, 25, (1968)].

U.S. Pat. No. 3,409,563 describes conductive graphite structures formulated from vermicular graphite and an agent such as $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, and $YCl_3$. The treated vermicular graphite is then compressed into structures.

German Pat. No. 2,537,272 discloses the formation of an electrically conductive graphite intercalation compound employing a strong acid halide system wherein graphite is reacted with "the proton donor (Bronsted acid), hydrogen fluoride, and an electron acceptor (Lewis acid) such as boron trihalide, a tetrahalide from a Group IV metal, or a pentahalide from a Group V metal."

It has been reported that sulfur trioxide alone will intercalate graphite. See, for instance, C.R. Acad. Sci. Paris, Vol. 262, pages 1074 to 1075 (1966) by Michele Bogouin, Herve Fuzellier and Albert Herold.

Additionally, it has been reported that a mixture of sulfur acid and sulfur trioxide will intercalate graphite and thereby increase its electrical conductivity. See, for instance, Physica, Vol. 99B, pages 541 to 546 (1980) by E. McRae, A. Metrot, P. Willmann and A. Herold.

In U.S. Pat. No. 4,293,450 is disclosed the intercalation of graphite with (a) fluorosulfonic acid, chlorosulfonic acid, or mixtures thereof, and (b) a boron trihalide, a tetrahalide of a Group IV element, a pentahalide of a Group V element, or mixtures thereof. This disclosure is silent concerning how the desired intercalation could be aided through the presence of another reactant such as that claimed herein.

In commonly assigned U.S. Pat. No. 4,388,227 and U.S. Ser. No. 445,758, filed Nov. 30, 1982, is described an improved carbonaceous fibrous material comprising graphitic carbon which has been found to be particularly suited for intercalation.

It is an object of the present invention to provide an improved process for forming an intercalated electrically conducting composition.

It is another object of the present invention to provide an improved process whereby graphite is intercalated at an increased rate and possibly a greater electrical conductivity is achieved in the final intercalated product.

It is another object of the present invention to form an intercalated graphite product of maximum conductance within a minimum amount of time.

It is a further object of the present invention to provide an improved process for the intercalation of graphite which can be carried out on a relatively economical basis with the need to employ only small amounts of relatively expensive intercalant.

These and other objects, as well as the scope, nature, and utilization of the claimed invention will be apparent to those skilled in the art from the following detailed description and appended claims.

SUMMARY OF THE INVENTION

It has been found in a process for forming an intercalated electrically conducting composition comprising reacting graphite in a reaction zone under anhydrous conditions with a reactant selected from the group consisting of:
(a) a sulfur-containing reactant selected from the group consisting of fluorosulfonic acid, chlorosulfonic acid, and mixtures thereof,
(b) a halide reactant selected from the group consisting of boron trihalide, a tetrahalide of a Group IV element, a pentahalide of a Group V element, and mixtures thereof, and
(c) mixtures of (a) and (b);
that improved results are achieved by additionally providing in the reaction zone during at least a portion of the reaction a sulfur trioxide reactant which is capable of aiding the increase in the electrical conductivity of the graphite.

In a preferred embodiment an improved process is provided for forming an intercalated electrically conducting fiber which is electrically oriented along its axis comprising reacting in an reaction zone under anhydrous conditions a carbonaceous fibrous material comprising graphitic carbon with the following reactants:
(a) a sulfur-containing reactant selected from the group consisting of fluorosulfonic acid, chlorosulfonic acid, and mixtures thereof,
(b) a halide reactant selected from the group consisting of boron trihalide, a tetrahalide of a Group IV element, a pentahalide of a Group V element, and mixtures thereof, and
(c) a sulfur trioxide,
wherein the sulfur trioxide reactant is capable of substantially aiding the increase in the electrical conductivity of the carbonaceous fibrous material comprising graphitic carbon.

DESCRIPTION OF PREFERRED EMBODIMENTS

The graphite which is intercalated in accordance with the present invention may be provided in a variety of physical configurations at the time of intercalation. For instance, the graphite may be initially provided in the form of large crystals, crystalline powder, bulk or sintered graphite, carbonaceous fibrous materials (i.e. carbon fibers) which include graphitic carbon, etc. It is a general rule that the more perfect the graphite starting material is, the better the conductivity of the resultant graphite intercalation compound. Hence, it is preferable to employ graphite of relatively high purity and which has a high degree of crystallinity. However, graphite of lower degrees of purity and crystallinity can be selected. The structure of high modulus carbon filaments is such that the normal to the "c" axis of the graphite crystals present therein lies parallel to the filament axis and there is an axis of rotational symmetry about this normal. The graphite starting material can be conveniently formed by known techniques prior to the intercalation reaction described hereafter. In a particularly preferred embodiment the carbonaceous fibrous material is formed in accordance with the teachings of commonly assigned U.S. Pat. No. 4,388,227 which is herein incorporated by reference. There the carbonaceous fibrous material is derived from either an acrylonitrile homopolymer or a closely related copolymer and undergoes processing at an unusually high temperature. However, in less preferred embodiments, the carbonaceous fibrous material may be derived from other acrylic fibrous materials, cellulosic fibers, pitch fibers, polybenzimidazole fibers, etc.

A suitable reactant for use in forming an intercalated electrically conducting composition in accordance with the present invention is a sulfur-containing reactant selected from fluorosulfonic acid, chlorosulfonic acid, and mixtures of the same. This reactant must be anhydrous. Fluorosulfonic acid possesses the formula $HSO_3F$ and is a colorless fuming liquid having a boiling point of approximately 165° C. This fluorosulfonic acid reactant sometimes is designated "fluorosulfuric acid" or "fluorosulfonic acid" in the literature. Chlorosulfonic acid possesses the formula $HSO_3Cl$ and is a colorless to light yellow liquid having a boiling point of approximately 158° C. The chlorosulfonic acid reactant sometimes is designated sulfuric chlorohydrin. The customary care should be taken in the handling of these highly toxic materials.

Another suitable reactant for use in forming an intercalated electrically conducting composition in accordance with the present invention is a halide reactant selected from the group consisting of a boron trihalide, a tetrahalide of a Group IV element (e.g. of a Group IV metal), a pentahalide of a Group V element (e.g. of a Group V metal), and mixtures thereof. This reactant must be anhydrous. The preferred halides for use in the present process are the fluorides. The Group IV elements may be under either of headings IVA or IVB of the periodic table published at Page 662 of "The Condensed Chemical Dictionary", Ninth Edition, Van Nostrand Reinhold (1977). Preferred Group IV element tetrahalides are $SiF_4$ (i.e. silicon tetrafluoride), $HfF_4$ (i.e. hafnium tetrafluoride), $TiF_4$ (i.e. titanium tetrafluoride), and $ZrF_4$ (i.e. zirconium tetrafluoride). The Group V elements may be under either of headings VA or VB of the periodic table published at Page 662 of "The Condensed Chemical Dictionary", Ninth Edition, Van Nostrand Reinhold (1977). Preferred Group V element pentafluorides are $PF_5$ (i.e. phosphorus pentafluoride), $NbF_5$ (i.e. niobium pentafluoride), $TaF_5$ (i.e. tantalum pentafluoride), $AsF_5$ (i.e. arsenic pentafluoride), and $SbF_5$ (i.e. antimony pentafluoride). The particularly preferred halide reactant for use in the present invention is $SbF_5$. The usual care should be taken in the handling of the toxic halide reactant.

In a preferred embodiment the graphite is intercalated with a combination of the sulfur-containing reactant and the halide reactant heretofore described.

In accordance with the concept of the present invention it surprising has been found that the presence of sulfur trioxide in the reaction zone during at least a portion of the intercalation reaction will significantly aid the intercalation. For instance, the presence of sulfur trioxide has been found to greatly accelerate the intercalation reaction and may also lead to higher levels of conductivity than would have otherwise been possible. The sulfur trioxide can be provided in the reaction zone at the beginning of the intercalation reaction or it may be added in one or more increments during the course of the intercalation reaction.

When the sulfur-containing reactant is provided in the reaction zone with the sulfur trioxide reactant, the mole ratio of the former to the latter commonly will range from approximately 5:1 to 50:1, and preferably from approximately 10:1 to 20:1. When the halide reactant is present instead of the sulfur-containing reactant, however, it is used more sparingly primarily because of economic considerations and the mole ratio commonly will be approximately 0.05:1 to 1:1, and preferably from approximately 0.1:1 to 0.5:1. When the sulfur-containing reactant, the halide reactant, and the sulfur trioxide are provided in the reaction zone they commonly are each provided in molar ratios of approximately 10:1:1 to 100:0.1:1, and preferably in molar ratios of approximately 50:0.5:1.

The graphite and the reactants preferably are provided in the reaction zone during the course of the intercalation reaction at a temperature of approximately 20° to 90° C., and preferably at a temperature of approximately 25° to 35° C.

As will be apparent to those skilled in the art the desired intercalation of the graphite must be carried out in vessels which are capable of withstanding the reactants. Suitable materials for the reaction vessels include Type 304 stainless steel, Type 316 stainless steel, high nickel alloys (e.g. Monel alloy available from the Huntington Alloy Products Division of the International Nickel Co., Inc.), polytetrafluoroethylene (e.g. Teflon polymer available from E. I. DuPont de Nemours Co.), other fluorocarbon polymers (e.g. Kel-F polymer available from 3M Company), etc.

In the laboratory it has been found especially practical to combine the intercalating reactants with the graphite under inert conditions in a closed system. Typically, it is preferred to employ an apparatus such as a "dry box". This apparatus permits the materials to be placed separately, in sealed containers, into a closed chamber which is flushed with an inert gas such as dried argon or nitrogen. Access to the chamber is had through gas-tight gloves. Hence, the sealed containers are opened under an inert atmosphere and the desired intercalation reaction can be performed without fear of contamination.

It is essential that anhydrous conditions be maintained during the intercalation of the graphite. The reactants may be in the liquid and/or the gaseous form when contacted with the said graphite. Atmospheric or superatmospheric pressure conditions may be utilized during the intercalation reaction. Regardless of the degree of graphitic carbon perfection, or the reaction conditions selected, the presence of the sulfur trioxide will substantially aid the intercalation reaction.

The theory whereby the sulfur trioxide serves to benefit the intercalation reaction is considered to be complex and incapable of simple explanation. Possible explanations are as follows: (1) since the sulfur trioxide molecule is planar and of a relatively small size it can more readily enter between the graphite base planes and thereby facilitates a more facile intercalation by the bulkier intercalants, (2) since sulfur trioxide is a very strong oxidizing agent it may effect additional charge transfer into the graphite thereby enhancing the electrical conductance, and (3) since sulfur trioxide increases the acidity of superacid intercalants this may lead to mobile charge carrier enhancement and greater conductivity. It is not known whether any of these possible explanations is in fact operative.

Once a carbonaceous fibrous material containing graphitic carbon is intercalated in accordance with the present invention and is thereby rendered highly electrically conductive, it can be incorporated within a metal which is capable of protecting it against breakage and of imparting solderability to the same. Such metal/intercalated graphite composites can be prepared from any of a number of desired metals, and the particular metal employed is restricted solely by the intended application of the composite. Copper is deemed preferable for most applications, but excellent results are obtained from silver, aluminum, and nickel. For instance, if the graphite intercalation compound is present in filament form a metal plating technique can be employed. Hence, intercalated graphite filaments can be made the cathode in a metal plating solution. This process can be carried out batchwise, in which case an electrode is attached to one end of a yarn which is submerged in the plating solution. Alternatively, the composite can be made continuously by passing the filaments while in continuous form over a metal electrode and into the plating bath. Residence times and other reaction conditions are easily determinable by one of reasonable skill in the art, and such reaction parameters are functions of the particular plating bath, cathode current, graphite yarn conductivity, cross-sectional area, etc. Another method of forming metal composites of the intercalated graphite filaments comprises twisting metal strands or wires with the filaments. Hence, it is possible to greatly vary physical and electrical properties of conductors by varying the ratio of metal to graphite strands and by choosing strands of a particularly suitable metal. In such composite articles the intercalated graphite is electrically oriented along the axis of the resulting composite article, i.e. the resulting electrical conductor.

Additionally, powdered particulate intercalated graphite can be formed into a composite article employing a sheath method. In this method, a tube of the appropriate metal, such as $\frac{1}{4}$ inch outer diameter copper tubing, is filled with the intercalated graphite powder and the powder is lightly tamped therein. Excessive packing of the powder hampers electrical orientation of the graphite and is to be avoided. When full, the tube is preferably sealed and subjected to swaging. For instance, a $\frac{1}{4}$ inch outer diameter copper tube, filled with graphite powder, can be swaged down to a diameter of about 40 mils by means of a Torrington Swaging Mill. The resultant metal composite conductor accordingly comprises a 40 mil wire having excellent physical and electrical properties with the intercalation compound being electrically oriented along the axis of the conductor.

Electrical conductors which incorporate the intercalated graphite are lighter in weight than conventional metallic electrical conductors and can be utilized, for instance, to advantage in those applications where reduced weight is of importance. The electrical conductors of the present invention commonly have a configuration of an elongated wire. Other physical configurations are possible however. For instance, conductor strips can be formed for use as bus bars in electrical equipment. Additionally, electrically conductive composite articles can be formed wherein fibers containing the intercalated graphite are incorporated in a matrix material (e.g. an epoxy resin). Such lightweight composite articles are particularly suited for use in aircraft applications.

Because of the low density, in comparison to the metallic conductors, and the high current-carrying capability, the intercalated fiber conductor has great utility in numerous applications. Thus, when fabricated in the form of a fine low denier yarn, it is particularly suitable for use as a fine gauge magnet wire. Alternately, it may be plied, woven or braided to form stranded wire cables or tapes for use as lightweight electroconductors in transportation equipment, such as space vehicles, aircraft, naval vessels, trucks, etc., or in the communications and power transmission industries. Also, these products may be useful as efficient electrode materials in various non-aqueous batteries or as collectors for nonaqueous electroseparation processes.

The electrical conductivity and electrical resistivity of a carbonaceous fibrous material containing graphitic carbon before or after intercalation can be determined by the testing of individual filaments in accordance with a standard four point or four contact measuring technique designed to eliminate unwanted contact resistance. Principles of this method are presented in standard textbooks, such as "Electrical Measurements in Theory and Application", by A. W. Smith, 4th Edition, McGraw Hill Book Co., N.Y. (1948), which is herein incorporated by reference. More specifically, the filaments first are placed upon substrates comprising alumina ceramic plates possessing four spaced platinum strip contacts, and are attached to the strip contacts by baking with conductive gold paste. For convenience the inner voltage contacts are spaced one centimeter apart. A known electrical current is applied to the outer contacts and passes through the filament. The two inner contacts are connected to a high impedance voltmeter (preferably $>10^6$ ohm impedance) and the potential difference is accurately measured. Suitable filament substrates having the four spaced platinum strip contacts are commercially available from Affiliated Manufacturers of North Branch, N.J. A suitable conductive gold paste is No. 4350 gold paste, commercially available from the Cermally Co. of West Chonshohocken, Pa. When a d.c. measurement is made, the outer leads can be attached to a variable d.c. power supply such as Hewlett-Packard Model 6218A power supply which is adjusted to provide a constant current in the 10 to 100 micro-ampere range with the current being measured by means of a digital voltmeter (e.g., a Keithley Model 179 Multimeter) across a precision 5K ohm resistor. The potential difference between the inner voltage contacts can be measured directly either by a Keithley Model 179 Multimeter or recorded as a function of time on a Hewlett-Packard Model 7132A chart recorder. Alternatively, substantially identical volume resistivity values can be obtained through a.c. measurements (e.g., 60 Hertz) employing a Keithley Model 503 milliohm meter. Measurements can be carried out continuously during the intercalation. Prior to conducting the measurements the filament samples are initially heated at 80° to 100° C. in a vacuum oven at a pressure of 10 Torr or less for 1 to 1.5 hours to remove any adsorbed moisture and are then transferred to a controlled atmosphere chamber for electrical conductivity measurement and intercalation. The electrical conductivity and electrical resistivity then are calculated in accordance with standard procedures taking into consideration the measured potential difference, the gauge length (i.e., 1 cm.), and the filament cross-sectional area.

The following examples are given as specific illustrations of the formation of preferred graphite intercalation compounds of the present invention. It should be understood, however, that the invention is not limited to the specific details set forth in the examples.

EXAMPLE 1

A carbonaceous fibrous material comprising graphitic carbon and containing in excess of 99 percent carbon by weight was selected as the starting material. The carbonaceous fibrous material was derived from an acrylonitrile homopolymer and had been processed at a maximum temperature of approximately 3050° C. during its formation. A single filament was removed from a multifilamentary yarn bundle and was mounted as heretofore described for intercalation and testing. The physical properties of this filament were assumed to be substantially the same as those of adjacent filaments, i.e., the filament possessed a maximum cross section dimension of approximately 8 microns, had a peanut-shaped cross section, exhibited an average Young's modulus of approximately 110,000,000 psi, an average tensile strength of approximately 250,000 psi, and a bulk density of approximately 2.12 Kg./dm.$^3$.

The intercalation was carried out at room temperature (i.e., approximately 25° C.) while present in a steel dry box manufactured by the Kewannee Scientific Engineering Co. filled with dry nitrogen with the mounted filament being present in a glass container. The mounted fiber was covered with a 9 cm.$^3$ of a freshly prepared ternary intercalant liquid mixture consisting of fluorosulfonic acid, antimony pentafluoride, and sulfur trioxide in the weight ratio of 80:5:3.6 which corresponds to an approximate molar ratio of approximately 18:0.5:1. The resistance of the fiber was initially 762 ohms and dropped very quickly upon addition of the ternary intercalant to 19 ohms within 5 minutes. Over the next 6 hours, the resistance remained at ±1 ohm of that value. Accordingly, it is seen that the electrical conductivity of the fiber increased over 40 times within a very short period of time.

For comparative purposes, an intercalation similar to that described in Example 1 was carried out with the exception that no sulfur trioxide reactant was provided. More specifically, the mounted filament was covered with 9 cm.$^3$ of a freshly prepared binary intercalant liquid mixture consisting of fluorosulfonic acid and antimony pentafluoride in the weight ratio of 80:5 which corresponds to an approximate molar ratio of 36:1. The resistance of the filament was initially 758 ohms and dropped slowly to 210 ohms over approximately 60 minutes. After contact with the liquid intercalants for 260 minutes, the resistance reached 19 ohms. This data indicates that, while the same electrical conductivity was achieved in each instance, it took over 50 times longer to achieve such conductivity when the sulfur trioxide reactant was omitted.

EXAMPLE 2

Example 1 was substantially repeated with the exception that a greater concentration of sulfur trioxide was provided in the ternary intercalant liquid mixture. More specifically, the mounted fiber, while at room temperature (e.g., approximately 25° C.), was covered with 5 cm.$^3$ of a freshly prepared ternary intercalant liquid mixture consisting of fluorosulfonic acid, antimony pentafluoride, and sulfur trioxide in the weight ratio of 80:5:15.7 which corresponds to an approximate molar ratio of 4:0.1:1. The resistance of the fiber was initially 767 ohms and dropped to 25 ohms in 20 minutes. Over the next 10 minutes, the resistance remained unchanged and the experiment was discontinued. Accordingly, it is seen that the electrical conductivity of the fiber increased over 30 times. The result indicates that the amount of sulfur trioxide needed to accelerate the intercalation can be relatively small with respect to the fluorosulfonic acid which acts as a solvent for both the halide and sulfur trioxide and is relatively inexpensive. Furthermore, it is seen that use of a relatively large concentration of the sulfur trioxide as in Example 2 is not detrimental to the final electrical conductivity of the intercalated product.

This Example 2 was repeated with the exception that the ternary intercalant liquid mixture was not freshly prepared, but instead was premixed and stored in the dry box for four days prior to contact with the fiber. The resistance of the fiber was initially 847 and dropped to 36 ohms in 20 minutes and to 21 ohms in 45 minutes. Accordingly, it is seen that the electrical conductivity of the fiber increased over 40 times, and that the prior storage of the reactants, while mixed together, had no substantial adverse influence.

EXAMPLE 3

A multifilamentary yarn bundle of carbonaceous fibrous material comprising graphitic carbon, as described in Example 1, consisting of 384 substantially parallel filaments and having a length of approximately 1.5 meters was wound and secured on a specially constructed spool-type fixture designed for continuous four-terminal electrical resistance measurements of the bundle. The details of this configuration are described in detail in *Synthetic Metals*, Vol. 3, pages 169 to 176 (1981) by H. A. Goldberg and I. L. Kalnin which is herein incorporated by reference. The fixture bearing the carbonaceous fibrous material was placed in a glass container holding 30 cm.$^3$ of a freshly prepared binary mixture of fluorosulfonic acid and sulfur trioxide while present in the steel dry box filled with dry nitrogen. The fluorosulfonic acid and sulfur trioxide were provided in a weight ratio of 60:5 which corresponds to a molar ratio of approximately 10:1. Upon contact, the resistance of the multifilamentary yarn bundle dropped from 183 ohms to 5.3 ohms in 10 minutes. Accordingly, it is seen that the electrical conductivity of the multifilamentary bundle increased over 34 times.

This example next was repeated with the exception that a single fiber of the yarn was subjected to the same binary intercalant mixture using the mounting procedure of Examples 1 and 2. To the glass container containing the mounted fiber was added 3 cm.$^3$ of the binary intercalant. Upon contact with the fiber the resistance dropped from 1300 ohms to 44 ohms in 20 minutes. Accordingly, it is seen that the electrical conductivity of the fiber increased approximately 30 times.

For comparative purposes, Example 3 was repeated using both a multifilamentary bundle and a fiber wherein the sulfur trioxide reactant was omitted. It was found that the resistance dropped less than 5 percent in 16 or more hours. In those instances in which the fluorosulfonic acid was used in an as received form and was not distilled to the highest purity prior to use, the electrical conductivity was enhanced approximately 10 to 20 times after 8 to 24 hours of contact. It is believed that such increase was due to unidentified contaminants in the fluorosulfonic acid.

EXAMPLE 4

A multifilamentary yarn bundle of carbonaceous fibrous material comprising graphitic carbon similar to that employed in Example 1 was selected. The carbonaceous fibrous material was derived from an acrylonitrile homopolymer and had been processed at a lower maximum temperature during its formation of approximately 2750° C. The filaments of the yarn contained in excess of 99 percent carbon by weight, had an average Young's modulus of approximately 85,000,000 psi, and average tensile strength of approximately 300,000 psi, and a bulk density of approximately 2.03 Kg./dm.$^3$.

The multifilamentary yarn bundle was mounted as described in Example 3 and was placed in a glass vacuum line which was evacuated to below $1 \times 10^{-3}$ Torr of pressure and was backfilled with reactants as described hereafter without exposure to the laboratory atmosphere. This procedure was employed in order to compensate for the otherwise dense viscous nature of antimony pentafluoride in the absence of fluorosulfonic acid. The mounted yarn bundle was first exposed to antimony pentafluoride vapor which was generated by heating at 70°±3° C. to create a vapor pressure of approximately 50 Torr. While exposed to the antimony pentafluoride vapor at approximately 70° C., the resistance of the multifilamentary yarn very slowly decreased from 184.5 ohms to 164.0 ohms over a period of 180 minutes. This increase in electrical conductivity was only approximately 1.1 times. At this point, a sulfur trioxide vapor at approximately 70° C. was also allowed to contact the multifilamentary yarn. After equilibrium was established, the pressure in the chamber reached approximately 250 Torr. This corresponds to a molar ratio of antimony pentafluoride to the sulfur trioxide of 0.25:1. Following the addition of the sulfur trioxide vapor, the yarn resistance decreased much more rapidly to 40.6 ohms after 10 minutes, and to 7.6 ohms after 40 minutes, while the temperature was maintained at approximately 70° C. When the contents of the chamber were cooled to room temperature (i.e., approximately 25° C.), the resistance became 5.8 ohms. Accordingly, it is seen that the electrical conductivity increased over 32 times. The partial vapor pressures, and hence the molar ratio, of the two reactants can be set over a broad range by adjusting the temperatures of the halide and the sulfur trioxide containers independently of each other. This allows a ready establishment of the molar ratios of the halide to the sulfur trioxide over the preferred range of 0.1:1 to 0.5:1.

For comparative purposes, Example 4 was substantially repeated with the exception that only the sulfur trioxide reactant was utilized and was provided in the chamber at pressure of approximately 250 Torr at a temperature of approximately 23° C. The sulfur trioxide was introduced while saturated in a stream of nitrogen gas. While exposed to the sulfur trioxide vapor, the resistance of the yarn decreased slowly from 268.6 ohms to 46.0 ohms over a period of 180 minutes. Accordingly, it is seen that the electrical conductivity of the yarn increased only 6 times. After another 16 hours of exposure, the resistance decreased to 7.5 ohms. A total conductivity enhancement of approximately 36 times was achieved over a relatively long period of time.

For comparative purposes, Example 4 was substantially repeated with the exception that a single fiber of the carbonaceous fibrous material containing graphitic carbon was mounted as described in Example 1 and was subjected to antimony pentafluoride vapor in the absence of sulfur trioxide. More specifically, the mounted fiber was forcibly immersed in a glass vessel containing liquid antimony pentafluoride at room temperature (i.e., approximately 25° C.). The resistance of the fiber decreased slowly from 1340 ohms to 41 ohms over a period of 285 minutes. Accordingly, it is seen that the electrical conductivity of the fiber increased approximately 32.7 times over a relatively long period of time in the absence of sulfur trioxide.

Although the invention has been described with preferred embodiments, it is to be understood that variations and modifications may be employed without departing from the concept of the invention as defined in the following claims.

We claim:

1. In a process for forming an intercalated electrically conducting composition comprising reacting graphite in a reaction zone under anhydrous conditions with a reactant selected from the group consistng of:
    (a) a sulfur-containing reactant selected from the group consisting of fluorosulfonic acid, chlorosulfonic acid, and mixtures thereof,
    (b) a halide reactant selected from the group consisting of boron trihalide, a tetrahalide of a Group IV element, a pentahalide of a Group V element, and mixtures thereof, and
    (c) mixtures of (a) and (b);

the improvement of additionally providing in said reaction zone during at least a portion of said reaction while at a temperature of approximately 20° to 90° C. a sulfur trioxide reactant which is capable of aiding the increase in the electrical conductivity of the graphite with the proviso that when reactant (a) is present with said sulfur trioxide as a binary mixture the molar ratio is approximately 5:1 to 50:1, when reactant (b) is present with said sulfur trioxide as a binary mixture the molar ratio is approximately 0.05:1 to 1:1, and when reactants (a) and (b) are present with said sulfur trioxide as a ternary mixture the molar ratios are approximately 10:1:1 to 100:0.1:1.

2. A process for forming an intercalated electrically conducting composition according to claim 1 wherein said graphite is in the form of a fiber and the resulting intercalated electrically conducting composition is electrically oriented along it axis.

3. An improved process for forming an intercalated electrically conducting composition according to claim 1 wherein said sulfur-containing reactant (a) is fluorosulfonic acid.

4. An improved process for forming an intercalated electrically conducting composition according to claim 1 wherein said halide reactant (b) is a fluoride.

5. An improved process for forming an intercalated electrically conducting composition according to claim 1 wherein said halide reactant (b) is a Group IV element tetrahalide selected from the group consisting of SiF$_4$, HfF$_4$, TiF$_4$ and ZrF$_4$.

6. An improved process for forming an intercalated electrically conducting composition according to claim 1 wherein said halide reactant (b) is a Group V element pentahalide selected from the group consisting of $PF_5$, $NbF_5$, $TaF_5$, $AsF_5$ and $SbF_5$.

7. An improved process for forming an intercalated electrically conducting composition according to claim 1 wherein said halide reactant (b) is antimony pentafluoride.

8. An improved process for forming an intercalated electrically conducting composition according to claim 1 wherein said sulfur-containing reactant (a) is fluorosulfonic acid and said halide reactant (b) is $SbF_5$.

9. An improved process for forming an intercalated electrically conducting composition according to claim 1 wherein said reactants (a) and (b) are present with said sulfur trioxide as a ternary mixture and wherein the molar ratios of reactant (a), reactant (b), and sulfur trioxide, provided in the reaction zone are approximately 50:0.5:1.

10. An improved process for forming an intercalated electrically conducting composition according to claim 1 wherein the contents of said reaction zone are provided at a temperature of approximately 25° to 35° C. during the course of said reaction.

11. An improved process for forming an intercalated electrically conducting fiber which is electrically oriented along its axis comprising reacting in an reaction zone while at a temperature of approximately 20° to 90° C. under anhydrous conditions a carbonaceous fibrous material comprising graphitic carbon with the following reactants:
(a) a sulfur-containing reactant selected from the group consisting of fluorosulfonic acid, chlorosulfonic acid, and mixtures thereof,
(b) a halide reactant selected from the group consisting of boron trihalide, a tetrahalide of a Group IV element, a pentahalide of a Group V element, and mixtures thereof, and
(c) a sulfur trioxide,
wherein the molar ratios of reactants (a), (b), and (c) provided in the reaction zone are approximately 10:1:1 to 100:0.1:1 and wherein the sulfur trioxide reactant is capable of substantially aiding the increase in the electrical conductivity of the carbonaceous fibrous material comprising graphitic carbon.

12. An improved process for forming an intercalated electrically conducting carbonaceous fibrous material comprising graphitic carbon according to claim 11 wherein said sulfur-containing reactant (a) is fluorosulfonic acid.

13. An improved process for forming an intercalated electrically conducting carbonaceous fibrous material according to claim 11 comprising graphitic carbon wherein said halide reactant (b) is a fluoride.

14. An improved process for forming an intercalated electrically conducting carbonaceous fibrous material according to claim 11 wherein said reactant (b) is a Group IV element tetrahalide selected from the group consisting of $SiF_4$, $HfF_4$, $TiF_4$ and $ZrF_4$.

15. An improved process for forming an intercalated electrically conducting carbonaceous fibrous material according to claim 11 wherein said reactant (b) is a Group V element pentahalide selected from the group consisting of $PF_5$, $NbF_5$, $TaF_5$, $AsF_5$ and $SbF_5$.

16. An improved process for forming an intercalated electrically conducting carbonaceous fibrous material according to claim 11 wherein said reactant (b) is antimony pentafluoride.

17. An improved process for forming an intercalated electrically conducting carbonaceous fibrous material according to claim 11 wherein said sulfur-containing reactant (a) is fluorosulfonic acid and the halide reactant (b) is $SbF_5$.

18. An improved process for forming an intercalated electrically conducting carbonaceous fibrous material according to claim 11 where the molar ratios of reactants (a), (b) and (c) provided in the reaction zone are approximately 50:0.5:1.

19. An improved process for forming an intercalated electrically conducting composition according to claim 11 wherein the contents of said reaction zone are provided at a temperature of approximately 25° to 35° C. during the course of said reaction.

* * * * *